Patented June 10, 1941

2,245,177

UNITED STATES PATENT OFFICE 2,245,177

PROCESS OF PRODUCING METHINE-CYANINE DYESTUFFS

Fritz Bauer, Dessau, and Gustav Wilmanns, Wolfen, Kreis Bitterfeld, Germany, assignors, by mesne assignments, to General Aniline & Film Corporation, New York, N. Y., a corporation of Delaware No Drawing. Application December 7, 1938, Serial No. 244,390. In Germany December 9, 1937

5 Claims. (Cl. 260—240)

Our present invention relates to a new process of producing methinecyanine dyestuffs.

It has been proposed to make symmetrical and unsymmetrical trimethinecyanines by condensing an ω-aldehyde of a heterocyclic base with a heterocyclic body containing a reactive methyl- or methylene-group. These aldehydes are apt to have an oily or greasy form and in general it is very difficult, in many cases indeed impossible, to obtain a crystallization and thereby to arrive at a definite product. Thus, such substances are not particularly good for transformation to cyanine dyestuffs. Moreover, the dyestuff condensation does not always run smoothly and there is difficulty in obtaining merocyanines, that is to say cyanines which contain the rhodanine ring or homologues thereof. The dyestuffs produced can be obtained in a pure form only by repeated crystallization.

It is one object of our invention to avoid or minimize this disadvantage.

A further object of this invention is to provide a process of producing methinecyanine dyestuffs by starting from semicarbazones of ω-aldehydes of heterocyclic bases.

A still further object of the invention is the provision of a process of producing methinecyanine dyestuffs by starting from thiosemicarbazones of ω-aldehydes of heterocyclic bases.

Other objects of our invention will appear from the disclosure following hereinafter.

The above mentioned semi- and thiosemicarbazones correspond with the following general formula:

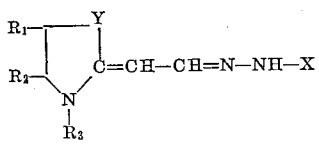

wherein $R_1$ and $R_2$=H, $H_2$, alkyl, aryl or phenylene and their substitution products,
$R_3$=alkyl or aralkyl, $Y=O, S, Se, -CH=CH-$ or $C\begin{smallmatrix}CH_3\\CH_3\end{smallmatrix}$ and $X=-C\begin{smallmatrix}O\\NH_2\end{smallmatrix}$ or $-C\begin{smallmatrix}S\\NH_2\end{smallmatrix}$ These semicarbazones and thiosemicarbazones are characterized by a good tendency to crystallize and by condensing with heterocyclic bodies which contain a reactive methyl-group or methylene- group in a very smooth and clean manner to symmetrical or unsymmetrical polymethine dyestuffs, the respective semicarbazide being eliminated. These dyestuffs may be used for dyeing or in optically sensitizing photographic emulsions. Symmetrical dyestuffs are produced if a base is used for condensation which has the same hetero-ring as that in the semicarbazone of the respective ω-aldehyde. Unsymmetrical dyestuffs are obtained if bases of another kind are used for the condensation.

A further advantage is that in many cases the reaction for condensation is unitary in the direction of the formation of dyestuff, whereas if ω-aldehydes are used secondary reactions may occur leading to colorless bodies that objectionably contaminate the dyestuffs formed and can be removed only with difficulty. Moreover, the yield obviously suffers owing to the formation of undesired secondary products.

The ω-aldehydes used as parent material are made by known processes, for instance that described in British Patent No. 438,278, wherein instead of the indoline bases there described the corresponding other hetero-bases, for instance thiazoles, selenazoles or oxazoles may be used. With these aldehydes there are produced in generally known manner corresponding semicarbazones and thiosemicarbazones by causing the ω-aldehyde to react with semicarbazide or thiosemicarbazide.

The following examples illustrate the invention:

*Example 1.*—0.2 gram of the semicarbazone of N-ethyl-2-methine-thiazoline - ω - aldehyde and 0.35 gram of N-phenyl-2-methylbenzimidazole ethiodide are mixed with 1.5 cc. of pyridine and 5 drops of acetic anhydride and the mixture is heated for about 20 minutes at a temperature between 75 and 95° C. 1.5 cc. of methanol is then added to the mixture. The latter is further heated for a short time and there are added to the hot mixture 3 cc. of sodium perchlorate solution of 20 per cent strength. The whole is now cooled while stirring and water is added cautiously until no more dyestuff crystallizes. The yield is 0.35 gram.

*Example 2.*—0.24 gram of the semicarbazone of N-ethyl-2-methine-thiazoline - ω - aldehyde and 0.35 gram of 2.5.6-trimethylibenzaxazole methiodide are condensed as described in Example 1 and the mixture is worked up. The dyestuff separates immediately in very beautiful pure crystals. The yield is 0.24 gram.

*Example 3.*—0.2 gram of tre semicarbazone of

N-ethyl-2-methine-benzthiazole-ω-aldehyde and 0.1 gram of rhodanine are dissolved in 2 cc. of pyridine with addition of 3 drops of acetic anhydride and the solution is condensed for about 15 minutes at a temperature of 80–90° C. 2 cc. of methanol are now added and the mixture is heated for a short time. While cooling and stirring water is gradually added until no more dyestuff crystallizes. The dyestuff is filtered with suction and washed with a mixture of alcohol and ether and with ether. The yield is 0.15 gram.

*Example 4.*—0.17 gram of the semicarbazone of N-ethyl-2-methine-thiazoline-ω-aldehyde and 0.1 gram of rhodanine are dissolved in 2 cc. of pyradine with addition of 3 drops of acetic anhydride, and the solution is condensed for about 15 minutes at a temperature of 80–90° C. The working up follows that described in Example 3. The yield is 0.1 gram.

*Example 5.*—0.2 gram of the thiosemicarbazone of N-ethyl-2-methine-thiazoline-ω-aldehyde and 0.27 gram of 2-methylbenzthiazole ethiodide are mixed with 2 cc. of pyridine and 3 drops of acetic anhydride, and the whole is condensed for about 10 minutes at a temperature between 80 and 90° C. 2 cc. of methanol are then added and the mass is again heated for a short time. To the warm solution 3 cc. of sodium perchlorate solution of 20 per cent strength are added. While rubbing and cooling water is gradually added until no more dyestuff crystallizes. The dyestuff is then cautiously washed with a mixture of ether and alcohol and with ether. The yield is 0.1 gram.

*Example 6.*—0.2 gram of the semicarbazone of N-ethyl - 2 - methine-benzselenazole-ω-aldehyde and 0.2 gram of 2-methyl-benzthiazole ethiodide are mixed with 2 cc. of pyridine and 3 drops of acetic anhydride, and the mixture is condensed for about 15 minutes at a temperature between 80 and 90° C. The dyestuff produced is worked up as described in Example 5.

*Example 7.*—1 gram of the semicarbazone of N-ethyl - 2 - methine-benzselenazole-ω-aldehyde and 1 gram of 2-methyl-thiazoline methiodide are condensed with 5 cc. of pyridine and 10 drops of acetic anhydride for 10 minutes at a temperature between 90 and 100° C. 3 cc. of methanol are then added and heating is continued for a short time. After adding 5 cc. of a sodium perchlorate solution of 20 per cent strength water is gradually added while cooling and stirring until no more dyestuff crystallizes. The dyestuff thus obtained is washed with a mixture of ether and alcohol and with ether.

*Example 8.*—1 gram of the semicarbazone of 1.1.3-trimethyl - 2 - methine-indoline-ω-aldehyde and 1 gram of 2-methylthiazoline ethiodide are condensed with 5 cc. of pyridine and 10 drops of acetic anhydride for 10 minutes at a temperature between 90 and 100° C. The working up follows that described in Example 7. The dyestuff crystallizes in red crystals and is washed with a mixture of alcohol and ether and with ether. The yield is 0.65 gram.

*Example 9.*—1.3 grams of the semicarbazone of 2-methine-quinoline-ω-aldehyde and 0.7 gram of rhodanine are mixed with 10 cc. of pyridine and 20 drops of acetic anhydride. The mass is condensed for 15 minutes at a temperature between 80 and 90° C. 10 cc. of methanol and 10 cc. of water are then added. After cooling the dyestuff thus produced is filtered with suction and washed with a mixture of alcohol and ether and with ether.

We claim:

1. A process of producing a methinecyanine dyestuff which comprises reacting the semicarbazone of N-ethyl-2-methine-thiazoline-ω-aldehyde with N-phenyl-2-methylbenzimidazole ethiodide in the presence of pyridine and acetic anhydride.

2. A process of producing a methinecyanine dyestuff which comprises reacting the thiosemicarbazone of N-ethyl-2-methine-thiazoline-ω-aldehyde with 2-methylbenzthiazole ethiodide in the presence of pyridine and acetic anhydride.

3. A process of producing a methinecyanine dyestuff which comprises reacting the semicarbazone of N-ethyl-2-methine-benzselenazole-ω-aldehyde with 2-methylbenzthiazole ethiodide in the presence of pyridine and acetic anhydride.

4. A process of producing a methine cyanine dyestuff which comprises reacting a compound selected from the class consisting of semicarbazones and semithiocarbazones of N-alkyl nitrogen heterocyclic compounds of the type used in cyanine dyes containing a monomethine-ω-aldehyde group attached to a reactive position of the heterocyclic ring with a compound of the group consisting of cyclammonium alkyl quaternary compounds having methyl groups in a reactive position in the hetero ring and heterocyclic compounds having reactive intracyclic methylene groups adjacent to cyclic keto groups, in the presence of pyridine and acetic anhydride.

5. A process of producing a methinecyanine dyestuff which comprises reacting a compound corresponding with the following formula:

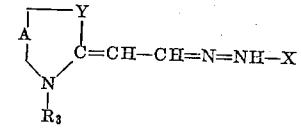

wherein A is a member of the class consisting of

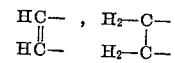

ortho phenylene and substituted ortho-phenylene; X is a member selected from the class consisting of

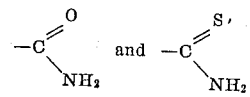

and Y is a member selected from the class consisting of

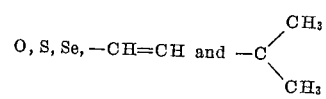

with a compound of the group comprising cyclammonium alkyl quaternary compounds having methyl groups in a reactive position of the hetero ring and hetero cyclic compounds containing reactive intracyclic methylene groups adjacent to cyclic keto groups, in the presence of pyridine and acetic anhydride.

FRITZ BAUER.
GUSTAV WILMANNS.